United States Patent [19]
Rifkin et al.

[11] Patent Number: 5,873,765
[45] Date of Patent: Feb. 23, 1999

[54] TOY HAVING DATA DOWNLOADING STATION

[75] Inventors: Andrew Rifkin, Palos Verdes; Peter Ar-Fu Lam, Torrance; Donald C. Hartling, Huntington Beach, all of Calif.

[73] Assignee: Mattel, Inc., El Segundo, Calif.

[21] Appl. No.: 797,364

[22] Filed: Jan. 7, 1997

[51] Int. Cl.$^6$ .................................................. A63H 03/28

[52] U.S. Cl. .......................... 446/301; 446/175; 446/298; 446/143

[58] Field of Search .................................. 446/143, 297, 446/298, 299, 300, 301, 175, 436, 484; 434/308, 307 R; 369/63

[56] References Cited

U.S. PATENT DOCUMENTS

| | | | |
|---|---|---|---|
| H1469 | 8/1995 | Simonoff | 446/456 |
| 4,712,184 | 12/1987 | Haugerud | 446/456 |
| 4,815,733 | 3/1989 | Yokoi | 446/175 |
| 4,840,302 | 6/1989 | Rose | 446/175 |
| 4,846,693 | 7/1989 | Baer | 446/298 |
| 4,930,019 | 5/1990 | Chu | 434/307 R |
| 5,191,615 | 3/1993 | Aldava et al. | 446/298 |
| 5,195,920 | 3/1993 | Collier | 446/456 |
| 5,209,695 | 5/1993 | Rothschild | 446/456 |
| 5,636,994 | 6/1997 | Tong | 446/298 |
| 5,648,999 | 7/1997 | Easterling et al. | 446/297 |
| 5,655,945 | 8/1997 | Jani | 446/299 |
| 5,697,829 | 12/1997 | Chainani et al. | 446/436 |

FOREIGN PATENT DOCUMENTS

| | | | |
|---|---|---|---|
| 2572300 | 5/1986 | France | 446/484 |
| 8302188 | 6/1983 | WIPO | 434/307 |

OTHER PUBLICATIONS

"Heath's HERO–1 Robot," product description, BYTE Publications, Jan. 1983, pp. 86–96.

*Primary Examiner*—Robert A. Hafer
*Assistant Examiner*—Jeffrey D. Carlson
*Attorney, Agent, or Firm*—Roy A. Ekstrand

[57] ABSTRACT

A conventional computer is coupled to a data downloading station which in turn receives a downloadable toy. The downloading station includes a data transmitter such as an infrared light emitting diode while the toy includes a corresponding receiver or sensor such as an infrared sensor. Data is selected by the user operating the computer and is downloaded to the toy via the communication link while the toy is situated in proximity to the downloading station. Once the data has been downloaded, it is stored within a memory within the toy. Thereafter, the toy may be removed from the downloading station and operated in response to the stored data while completely independent from the downloading station and the computer. In one embodiment, the data downloading station replicates a miniature computer work station supporting a light emitting diode for transmitting infrared energy and operatively coupled to the computer. A doll having an infrared sensor supported thereon is seatable within the miniature work station. The doll includes a processor and memory together with an audio system and a jaw moving system which cooperate to simulate speech by the doll. The doll may be downloaded with a substantial amount of words and phrases which are stored within the doll memory and communicated via the infrared communication link. Thereafter, the doll is operable independently from the work station providing simulated speech included coordinated audio output and jaw motion. The doll is also operable in a pass-through mode.

2 Claims, 4 Drawing Sheets

TOY HAVING DATA DOWNLOADING STATION

FIELD OF THE INVENTION

This invention relates generally to toys having internally powered mechanisms and particularly to those capable of producing motion sound or other action outputs.

BACKGROUND OF THE INVENTION

With the advent of small microelectronic circuitry and advances in small battery-powered motor systems, a variety of toys have been provided which include one or more battery-powered features operative in response to an internal microprocessor controlled circuit. The ability of toy makers to provide internal battery supplies and internal control circuitry within relatively small spaces has made possible a virtually endless variety of toys which are in one respect or another self-operative. For example, many toys such as dolls or toy figures as well as miniature toy vehicles or the like have been provided within internal battery-powered sound producing systems which facilitate sound response by the toys. Other toys utilizing such modern electronic capability have included remotely controlled toy vehicles or robot figures all having a seemingly self-contained capability to perform various actions and produce accompanying sounds. In several varieties of such self-sustained toys, external stimulus may be applied to provide a corresponding predetermined response within the toy figure. For example, toy dolls have been provided which may produce suitable audible responses as the doll is moved from a seated position to a prone position or similar attitude changes. Still other toy figures having internal processors and control systems have exhibited an interactive capability in which the child user interacts with the doll or toy figure and elicits various responses having a timing and relationship which simulate actual interactive communication.

In the various processor and microprocessor controlled toys and toy figures of the type described above, the processor or microprocessor includes an associate memory within which a stored instruction set is available to control the operation of the toy and to provide audio messages and the like. In further instances, toys have been provided in which the memory or a portion thereof operating the processor within the toy is supported upon a removable and replaceable cartridge allowing the interchange of memory cartridges within the toy to provide a greater variety of toy performance and responses.

While the various microprocessor controlled toys have provided great improvement in the art and, in many instances enjoyed commercial success, there remains nonetheless a continuing need in the art for evermore improved amusing and entertaining types of such toys.

SUMMARY OF THE INVENTION

Accordingly, it is a general object of the present invention to provide an improved toy having a processor controlled motion or response capability. It is a more particular object of the present invention to provide an improved toy having a data downloading station operative to store modified data within the processor memory of the toy and thereby program its behavior or response.

In accordance with the present invention, there is provided a toy system for use in combination with a computer having an input means and a data output, the toy system comprising: a data downloading station having means for receiving data from the computer data output and a data transmitter; and a toy receivable by the data downloading station and having a battery-powered response unit for producing toy action, a data receiver, a processor and a memory, the processor responding to the data receiver to store data within the memory and control the response unit thereafter once the toy is removed from the data downloading station.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENTS

Figure 1:
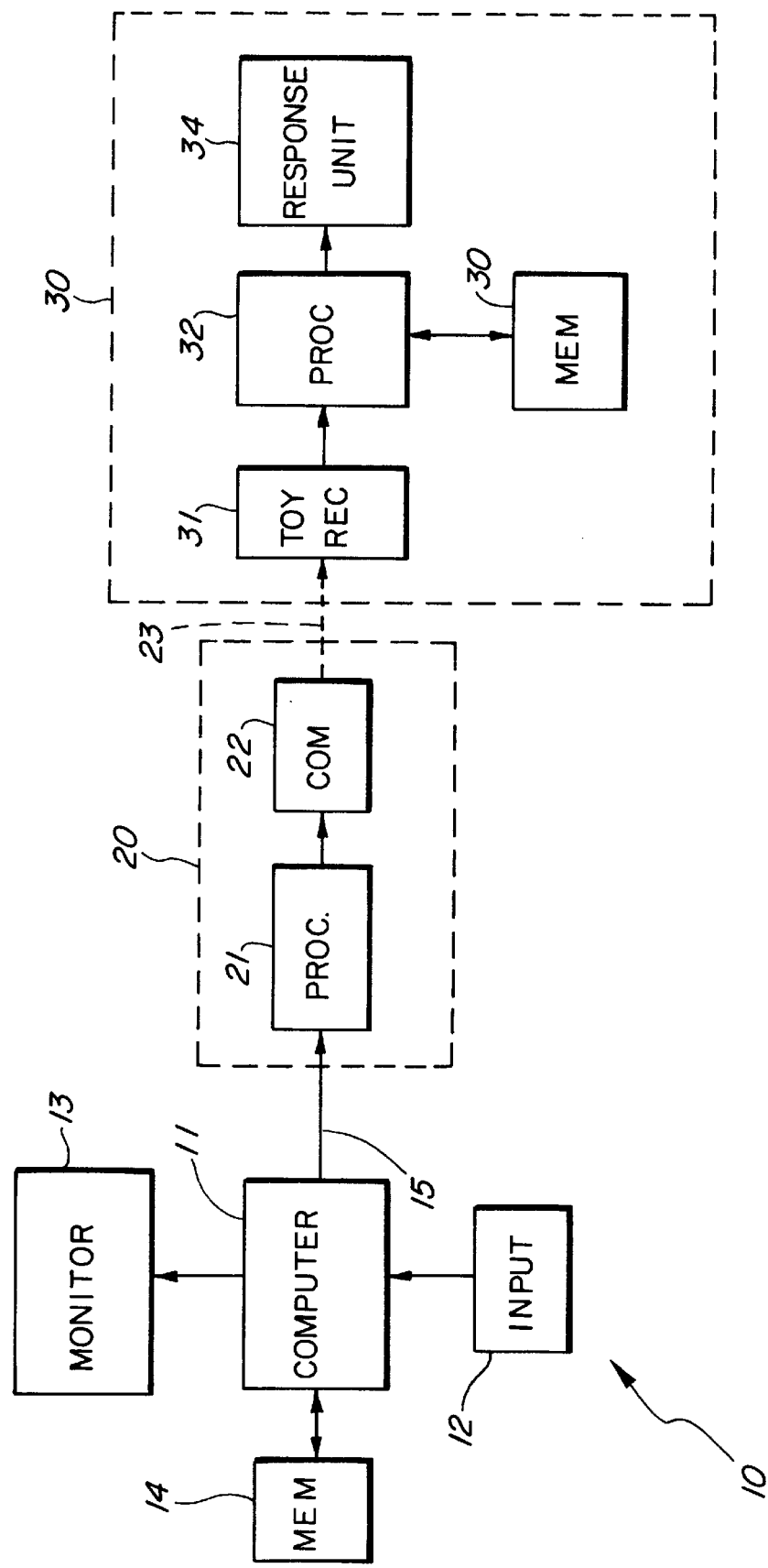
FIG. 1 sets forth a block diagram of a toy constructed in accordance with the present invention.

FIG. 1 sets forth a block diagram of a toy having a data downloading station constructed in accordance with the present invention and generally referenced by numeral 10. Toy 10 is shown in combination with a conventional computer 11 having an input system such as a conventional keyboard and/or conventional mouse input operative upon computer 11. Computer 11 further includes an associated memory 14 which may, for example, comprise a disk drive, a compact disk drive, or tape input or the like. Computer 11 also utilizes a conventional monitor 13. An output port 15 is provided upon computer 11 in accordance with conventional fabrication techniques to facilitate the output transfer of data in accordance with conventional formatting. For example, output communication port 15 may comprise the serial data output port of a conventional computer. Alternatively, communication port 15 may comprise the audio data output ports or, by still further alternative, may comprise the parallel data output ports of the computer.

In accordance with the present invention, toy 10 includes a data downloading station generally referenced by numeral 20 having a processor 21 therein operatively coupled to communication port 15 of computer 11. Data downloading station 20 further includes a communication transmitter 22 which provides a data transmitted output 23. Communication transmitter 22 is preferably fabricated to include a transmitting infrared transducer such as an infrared light emitting diode or the like together with appropriate drive circuitry also of conventional fabrication. Alternatively, however, communication transmitter 22 may utilize other energies for transmission such as radio frequency energy or visible light or acoustic energy. The essential aspect of the functioning of communication transmitter 22 is the conversion of applied data signals from processor 21 into appropriately encoded energy which is transmitted as communication link 23.

In further accordance with the present invention, toy 10 includes a toy generally referenced by numeral 30. Toy 30 includes a toy data receiver 31 responsive to the energy within communication link 23 as well as an energy transducer to convert the received encoded energy into data output signals. For example, in the event communication transmitter 22 utilizes an infrared output device and thus provides communication link 23 in the form of data encoded infrared information, toy data receiver 31 will be understood to include a cooperating infrared sensor to receive the infrared encoded data and for converting the infrared energy thus sensed or received into corresponding data signals. Correspondingly, in the event communication transmitter 22 utilizes an alternative energy for communication link 23, the sensor within toy data receiver 31 will be understood to provide a corresponding energy transducer. Thus, if communication transmitter 22 utilizes an ultrasonic transducer forming an encoded ultrasound communication link 23, toy data receiver 31 includes an ultrasound sensor for reconverting the ultrasound energy to appropriate data signals. Similarly, if communication transmitter 22 utilizes radio frequency energy, the sensor within toy data receiver 31 includes a radio frequency sensitive receiving device.

Toy data receiver 31 is coupled to a processor 32 having an associate memory 33. Processor 32 is further coupled to a response unit 34. Response unit 34 may, for example, provide a movement capability such as a motor driven apparatus for providing movement or motion of toy 30. Alternatively, response unit 34 may include a conventional sound circuit which provides audible output sound for communicating various messages or phrases or the like. Memory 33 includes conventional operating instructions for processor 32 as well as data storage capability operative in the manner described below to serve the needs of processor 32 in controlling response unit 34.

In operation, toy 30 is positioned in appropriate proximity to downloading station 20 to properly align toy data receiver 31 with communication transmitter 22 such that communication link 23 is established therebetween. In the preferred embodiment of the present invention in which an infrared communication link is utilized, this operation would include physically aligning toy 30 with respect to downloading station 20 to allow communication transmitter 22 to direct an infrared beam incident upon toy data receiver 31. Once toy 30 is properly positioned within or with respect to downloading station 20, the child user then employs input apparatus 12 to select various data commands which are desired to be transferred to toy 30. For example, in the event response unit 34 includes a sound circuit such that toy 30 is capable of producing audible phrases and words, the child user is able to select a variety of audible phrases which computer 11 converts into correspondingly encoded data and which is then outputted to processor 21 of data downloading station 20. Processor 21 formats the data output of computer 11 into a suitable format for processing by communication transmitter 22 via infrared link 23. Thereafter, the transmitted data within infrared communication link 23 is received by toy data receiver 31 and converted to appropriate data signals which are applied to processor 32. Processor 32 then further configures the received data and stores the various words and phrases selected by the child user within memory 33.

In accordance with an important aspect of the present invention, once the data which is to be transferred to toy 30 has been transferred via communication link 23, toy 30 may thereafter be physically removed from data downloading station 20 and will then process the various words and phrases within memory 33 in complete independence from downloading station 20 or computer 11. In this manner, toy 30 is capable of receiving a data download from computer 11 which is then used to control the operation of toy 30 in a completely independent manner.

Toy 10 may utilize a variety of toys without departing from the spirit and scope of the present invention. For example, toy 10 may include a toy vehicle 30 having appropriate operational apparatus such as a battery-powered drive system or the like which forms response unit 34. In this example, the user is able to input performance and operational data to computer 11 which is then communicated through downloading station 20 to the toy vehicle during a data download. Once the data download is complete, the toy vehicle may be removed from proximity to downloading station 20 and may operate in an independent capability in which the operational and command data stored within memory 33 controls the toy vehicle operation.

In the embodiment set forth below in FIGS. 3 and 4, toy 30 comprises a doll having a response unit which includes a sound circuit and audio output together with a motor driven jaw moving mechanism whereby the doll simulates the action of human speech. As is described below in greater detail in the embodiments of FIGS. 3 and 4, this embodiment of the present invention facilitates placing the doll in proximity to the downloading station which in the embodiment below is a toy work station, such that infrared communicated data from the computer through the downloading station provides a plurality of stored audio messages and phrases to be retained within the memory within the doll. Once this download of data is complete, the doll may then be removed from the downloading station and operated independently. Of importance to note is the absence of any mechanical or electrical connection requirements in the present invention toy system.

In the embodiment of FIG. 1, the presence of processor 21 within data downloading station 20 is provided to facilitate reformatting the standard formatted output data of computer 11 at output port 15. This reformatting is utilized to suit the format required for communication transmitter 22, toy data receiver 31 and memory 33. For example, communication port 15 may be the standard serial data port of computer 11. In such case, the data output thereof comprises a standard RS-32 data output. Processor 21 converts the standard RS-32 formatted data to the format which is required for storing information within memory 33. In addition, computer 11 may provide further data such as timing or synchronization data which is also processed by processor 21 to assure proper synchronization performance within toy 30. In the alternative of the present invention set forth below in FIGS. 3 and 4 in which the doll's jaw is moved to simulate speech, computer 11 provides synchronization data together with the audio data selected by the user in order to provide realistic jaw motion relating to spoken phrases or words.

Figure 2:
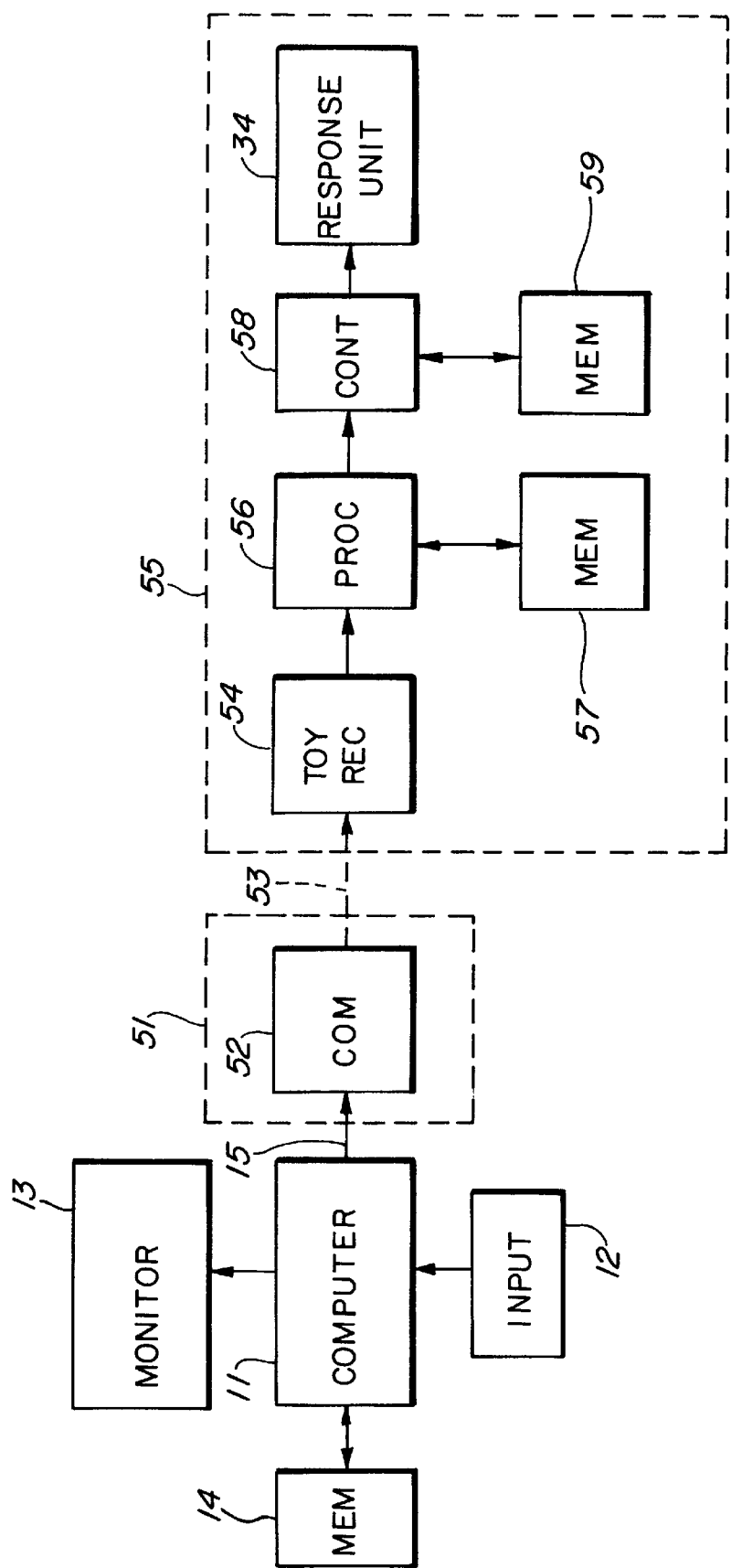
FIG. 2 sets forth a block diagram of an alternate embodiment of the present invention toy.

FIG. 2 sets forth a block diagram of an alternate embodiment of the present invention which differs from the embodiment of FIG. 1 in the location within the system of data formatting to accommodate the infrared communication link between the downloading station and the toy. More specifically, FIG. 2 sets forth a toy system 50 fabricated in accordance with the present invention operative in combination with a computer 11 having an input system 12, a monitor 13 and an associated memory 14. Computer 11 includes an output port 15 coupled to a communication transmitter 52 operative within a data downloading station 51. Communication transmitter 52 provides a communication link 53 which is received by a toy data receiver 54 within a cooperating toy 55. Toy 55 includes a processor 56 having an associated memory 57. Processor 56 is operatively coupled to toy data receiver 54 and is further coupled to a controller unit 58. Controller unit 58 includes an associated memory 59 and is coupled to a response unit 34.

By way of overview, the embodiment of the present invention set forth in FIG. 2 operates in a virtually identical manner to the operation of the embodiment set forth in FIG. 1 within the primary difference being the point within the system at which the data is formatted for storage within memory within the cooperating toy. In the embodiment of FIG. 2, data inputted by the user at input 12 is processed by computer 11 and communicated to communication transmitter 52 via communication port 15. Unlike the system set forth above in FIG. 1, the system shown in FIG. 2 does not further process the output data of communication port 15 prior to transmission to toy 55 via communication link 53. Instead, communication transmitter 52 simply converts the standard RS-32 data provided at communication port 15 to toy data receiver 54 via infrared communication link 53. Thereafter, processor 56 within toy 55 reformats the received data into the appropriate format for storage within memory 57. Processor 56 provides appropriate data for controller 58 to function in accordance with a stored instruction set within memory 59. Controller 58 operates in response to processor inputs and data stored within memory 57 and command information within memory 59 to control response unit 34.

Figure 3:
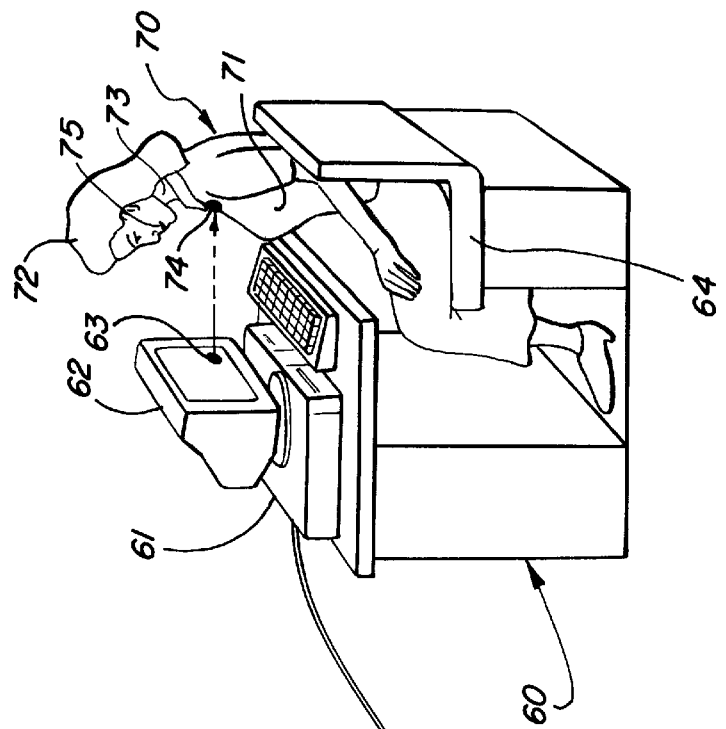
FIG. 3 sets forth a perspective view of a doll having a data downloading station and cooperating computer operative in accordance with the present invention.

FIG. 3 sets forth a perspective view of an embodiment of the present invention toy system in which a toy work station 60 receives and supports a doll 70 to facilitate the above-described data downloading operation. Toy work station 60 is operatively coupled to a conventional computer 11 which in accordance with conventional fabrication techniques includes a monitor 13 having a viewing screen 16. Computer 11 further includes a keyboard 12 and a CD-ROM drive 14 also fabricated in accordance with conventional fabrication techniques. A compact disc 17 is insertable into CD-ROM drive 14 in accordance with conventional fabrication techniques to facilitate the reading of data stored upon disc 17. A communication port 15 of computer 11 is operatively coupled to work station 60. Work station 60 is configured to replicate a computer work station and thus a simulated toy computer 61 supports a simulated toy monitor 62. In accordance with the present invention, toy monitor 62 supports an infrared light emitting diode 63 directed generally toward doll 10. Work station 60 also includes a seating surface 64 upon which doll 70 is rested. Doll 70 includes the operative system set forth in FIG. 4 and is generally formed to correspond to a female doll. Accordingly, doll 70 includes a head 72 formed of a malleable plastic material and having a movable mouth 75 formed therein. Doll 70 also includes a neck 73 and a torso 71 as well as appropriate arm and leg appendages. In accordance with the present invention, doll 70 includes an infrared sensor 74 supported at the frontal portion of neck 73. Sensor 74 is located upon doll 70 such that sensor 74 is aligned with transmitting infrared light emitting diode 63 when doll 70 is seated within work station 60.

In operation, doll 70 is positioned within work station 60 in the manner shown such that sensor 71 and transmitting light emitting diode 63 are properly aligned. Thereafter, the child user interacts with computer 11 and inserts compact disc 17 into CD-ROM drive 14 thereof. In accordance with conventional fabrication techniques, compact disc 17 includes optically encoded stored data which comprises the operational and command data for the present invention toy as well as plurality of audible phrases preferably grouped into related groups for selection by the child user. Thus, in a typical operation, the child user utilizes input keyboard 12 to select a plurality of customized sentences as well as other words and phrases which the child user desires to have articulated by doll 70. Computer 11 outputs the selected words and phrases together with synchronization data to work station 60 which, as described above, includes appropriate processing and communication transmitting circuitry for converting the computer output data to a properly encoded infrared data communication using light emitting diode 63. The encoded infrared data is received by sensor 74 of doll 70 and, as described below in FIG. 4, is converted to data signals which are processed within doll 70 and stored within memory 81 (seen in FIG. 4) which is enclosed within torso 71 of doll 70. Once the download of data from computer 11 selected by the child user is complete, doll 70 is capable of independent operation in the manner described below in FIG. 4 without further interaction with computer 11.

An alternative mode of operation may be utilized, however, in which doll 70 remains seated within work station 60. In this alternative mode of operation, a "pass-through" mode of operation allows doll 70 to be operative while remaining situated within work station 60 in response to the selection of words and phrases by the child user operating computer 11. In this mode of operation, the storage of the transferred words and phrases within memory 81 (seen in FIG. 4) of doll 70 is not utilized. Rather, doll 70 operates in direct real time response to the infrared data received by sensor 74 to produce audible words and phrases encoded therein. Thus, the child user selects words and phrases which are communicated to doll 70 and "voiced" by doll 70 while mouth 75 is moved in synchronism.

Figure 4:
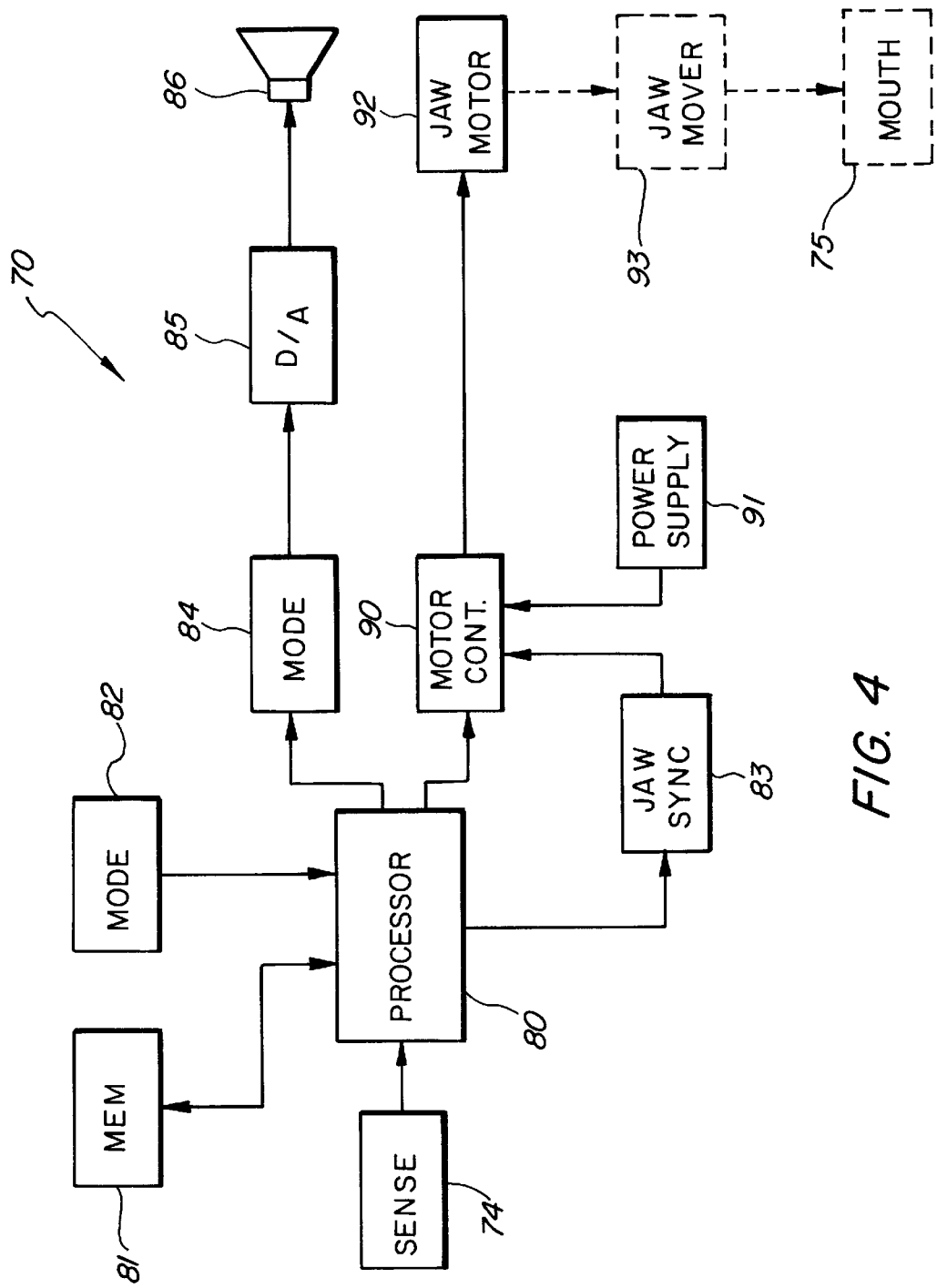
FIG. 4 sets forth a block diagram of the operative system within the doll of FIG. 3.

FIG. 4 sets forth a block diagram of the operative system within doll 70. Doll 70 includes a processor 80 coupled to an infrared sensor 74 and having an associate memory 81. A mode select input 82 is coupled to processor 80. Processor 80 includes an audio signal output coupled to a digital to analog converter 84, the output of which is coupled to an amplifier 85 which in turn is coupled to a speaker 86. Processor 80 further includes a motor control signal output coupled to a motor control 90. A jaw motor 92 is coupled to and controlled by motor control 90. Jaw motor 92 is mechanically coupled to a jaw moving mechanism 93 which in turn is mechanically coupled to movable mouth 75. It will be understood that the mechanical apparatus which responds to and is powered by jaw motor 92 in moving mouth 75 may be fabricated in accordance with a variety of fabrication techniques with the essential function being the movement of mouth 75 to simulate speech action by doll 70.

A jaw synchronizing unit 83 is operatively coupled to processor 80 and provides synchronization signals coupled to motor control 90. To avoid contamination of the data communicated via the infrared communication link described above, motor control 90 and jaw motor 92 utilize an isolated and separate battery power supply from that which is used to power the remaining circuitry within doll 70. Thus, it will be understood that sensor 74, processor 80, jaw synchronizing system 83, memory 81, mode 82 as well as digital to analog converter 84 and amplifier 85 are powered by a separate battery supply in accordance with conventional techniques (not shown).

In operation, sensor 74 receives encoded infrared information which is converted within sensor 74 to corresponding data signals appropriate to be processed by processor 80. As described above, the infrared data encoded communication received by sensor 74 includes a number of selected words and phrases chosen by the child user and communicated via the infrared communication link. As is also set forth above, in the preferred fabrication of the present invention, computer 11 (seen in FIG. 3) also encodes synchronizing data within the outputted data suitable for synchronizing the movement of mouth 75 in relation to the words and phrases being downloaded. This synchronization data is converted within sensor 74 along with the audio data of the selected words and phrases and is separated within processor 80 to provide jaw motion synchronization information for jaw synchronization system 83. In the preferred fabrication of the present invention, this jaw synchronization information comprises a mouth open and mouth close signal which is periodically inserted in an alternating fashion at appropriate points within the data. Processor 80 then applies the audio data to digital to analog converter 84 which converts the applied digital information signals to corresponding analog signals suitable for driving amplifier 85 and speaker 86. Processor 80 further provides information to motor control 90 which, together with the synchronizing information provided by jaw synchronizing system 83, operates to activate jaw motor 92 in an appropriate manner to provide mouth open and mouth closure motions of jaw mover 93 and thereby mouth 75.

In accordance with an important aspect of the present invention, processor 80 operates initially in response to the audio data and jaw synchronizing information provided by sensor 74 to either store the words and phrases and synchronizing information within memory 81 for subsequent use or pass the jaw synchronizing and audio data directly to the remainder of the system in the above-described pass-through mode of operation. Mode selection 82 is utilized in providing processor 80 with a selection input to determine which mode of operation is carried forward. Thus, if mode selector 82 is set in the normal mode of operation, audio and jaw synchronizing data received by sensor 74 is stored within memory 81 by processor 80 to be subsequently used once doll 70 is removed from work station 60 (seen in FIG. 3). In this mode of operation, doll 70 is downloaded with a substantially large number of words and phrases and associated jaw synchronizing information in a single download operation afterwhich doll 70 is operable when removed from downloading station 60 in a completely independent fashion. Conversely, with mode selector 82 inputting a pass-through mode selection, processor 80 responds accordingly and allows audio and jaw synchronizing information to be immediately passed through the system to cause doll 70 to speak and simulate jaw motion while seated within the work station.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A toy system operable in response to data received from a computer having an input means and a data output, said toy system comprising:

a doll configurable into a seated position;

a downloading station having means for data coupling to receive data signals from a computer and having means for receiving and supporting said doll without electrical connection thereto, said means for receiving said doll including a seating environment;

an infrared-transmitter, within said downloading station, constructed to receive data from a computer and produce infrared signals incoded to communicate received data;

an infrared sensor, supported by said doll, responding to said infrared signals and converting said infrared signals to corresponding data signals;

a processor, supported within said doll and having an associated memory, operative to store data received from said infrared sensor; and speech simulating means, supported within said doll and responsive to said processor, for causing said doll to appear to speak audible phrases using data stored in said memory once said doll is removed from said downloading station.

2. A toy system set forth in claim 1 further including means for operation said doll in a pass through mode in which said doll appears to speak in real-time while seated in said seating environment.

* * * * *